US008310557B1

(12) United States Patent
Rogina

(10) Patent No.: US 8,310,557 B1
(45) Date of Patent: Nov. 13, 2012

(54) CAMERA ARRANGEMENTS WITH BACK LIGHTING DETECTION AND METHODS OF USING SAME

(76) Inventor: Peter R. Rogina, Bridgewater, NJ (US)

( * ) Notice: Subject to any disclaimer, the term of this patent is extended or adjusted under 35 U.S.C. 154(b) by 1382 days.

(21) Appl. No.: 11/824,972

(22) Filed: Jul. 2, 2007

Related U.S. Application Data

(63) Continuation of application No. 10/271,844, filed on Oct. 15, 2002, now Pat. No. 7,239,345.

(60) Provisional application No. 60/328,914, filed on Oct. 12, 2001, provisional application No. 60/373,433, filed on Apr. 18, 2002.

(51) Int. Cl.
*H04N 13/02* (2006.01)
*H04N 7/18* (2006.01)
*H04N 5/225* (2006.01)
*H04N 5/262* (2006.01)

(52) U.S. Cl. ........ 348/218.1; 348/48; 348/159; 348/239

(58) Field of Classification Search ............... 348/425.3, 348/E5.058, E5.083; 385/43
See application file for complete search history.

(56) References Cited

U.S. PATENT DOCUMENTS

| | | | |
|---|---|---|---|
| 3,560,644 A | 2/1971 | Petrocelli et al. | |
| 4,054,881 A | 10/1977 | Raab | |
| 4,062,045 A | 12/1977 | Iwane et al. | |
| 4,103,435 A | 8/1978 | Herndon | |
| 4,541,007 A | 9/1985 | Nagata et al. | |
| 4,571,616 A | 2/1986 | Haisma et al. | |
| 4,613,866 A | 9/1986 | Blood | |
| 4,742,356 A | 5/1988 | Kuipers | |
| 4,757,378 A | 7/1988 | Hackett, Jr. et al. | |
| 4,772,942 A | 9/1988 | Tuck et al. | |
| 4,805,015 A | 2/1989 | Copeland | |
| 4,858,149 A | 8/1989 | Quarendon et al. | |
| 4,879,596 A | 11/1989 | Miura et al. | |
| 4,879,597 A | 11/1989 | Barton et al. | |
| 4,881,122 A | 11/1989 | Murakami et al. | |
| 4,928,175 A | 5/1990 | Haggren et al. | |
| 4,931,817 A | 6/1990 | Morioka et al. | |
| 4,943,854 A | 7/1990 | Shiota et al. | |
| 4,943,864 A | 7/1990 | Elberbaum et al. | |
| 4,952,024 A | 8/1990 | Gale et al. | |

(Continued)

FOREIGN PATENT DOCUMENTS

JP 61-125686 6/1986

(Continued)

OTHER PUBLICATIONS

American Cinematographer: Virtual Camera Movement, vol. 77, No. 9, pp. 93-100 (Sep. 1996).

(Continued)

*Primary Examiner* — Quang N. Nguyen
(74) *Attorney, Agent, or Firm* — Doherty & Charney LLC

(57) ABSTRACT

The present invention relates to camera arrangements with backlighting detection. The camera arrangements are capable of simultaneously capturing real scene data from various viewpoints. This data may include illumination data impinging the scene. The illumination data may then be utilized to alter the apparent illumination of a second image, either real or virtual, which is to be superimposed over the real scene so that the illumination across the entire superimposed scene is consistent. The camera arrangements may utilize combinations of umbilical cables and light tubes to expand or contract the field of capture. The camera arrangements may also include in-line signal processing of the data output.

27 Claims, 5 Drawing Sheets

U.S. PATENT DOCUMENTS

| | | | |
|---|---|---|---|
| 4,957,351 A | 9/1990 | Shioji et al. | |
| 4,970,666 A | 11/1990 | Welsh et al. | |
| 5,015,188 A | 5/1991 | Pellosie, Jr. et al. | |
| 5,015,189 A | 5/1991 | Wenzinger | |
| 5,023,725 A | 6/1991 | McCutchen | |
| 5,049,987 A | 9/1991 | Hoppenstein | |
| 5,084,763 A | 1/1992 | Naradate et al. | |
| 5,101,269 A | 3/1992 | Shelley et al. | |
| 5,109,194 A | 4/1992 | Cantaloube et al. | |
| 5,130,794 A | 7/1992 | Ritchey | |
| 5,148,310 A | 9/1992 | Batchko | |
| 5,172,266 A | 12/1992 | Garcia et al. | |
| 5,187,571 A | 2/1993 | Braun et al. | |
| 5,268,998 A | 12/1993 | Simpson | |
| 5,293,529 A | 3/1994 | Yoshimura et al. | |
| 5,311,305 A | 5/1994 | Mahadevan et al. | |
| 5,313,567 A | 5/1994 | Civanlar et al. | |
| 5,432,895 A | 7/1995 | Myers | |
| 5,475,511 A | 12/1995 | Haines et al. | |
| 5,479,597 A | 12/1995 | Fellous | |
| 5,553,618 A | 9/1996 | Suzuki et al. | |
| 5,659,323 A | 8/1997 | Taylor | |
| 5,703,961 A | 12/1997 | Rogina et al. | |
| 5,879,289 A * | 3/1999 | Yarush et al. | 600/179 |
| 6,154,251 A | 11/2000 | Taylor | |
| 6,292,608 B1 * | 9/2001 | Toh | 385/43 |
| 6,393,144 B2 | 5/2002 | Rogina et al. | |
| 6,501,518 B2 * | 12/2002 | Smith et al. | 348/425.3 |
| 6,522,787 B1 * | 2/2003 | Kumar et al. | 348/E5.058 |
| 6,535,226 B1 * | 3/2003 | Sorokin et al. | 348/E7.086 |
| 6,750,904 B1 | 6/2004 | Lambert | |
| 2002/0063775 A1 | 5/2002 | Taylor | |

FOREIGN PATENT DOCUMENTS

| | | |
|---|---|---|
| WO | 96/21197 | 7/1996 |

OTHER PUBLICATIONS

Ritchey, Kurtis J. "Image Based Panoramic Virtual Reality System, Simulated Environments," p. 167.

Quinio, Philippe, "A Random Set Approach to 3D Scene Reconstruction by Steroscopic Vision, Steroscopic Displays and Application III," p. 173.

Takahasi, et al., "Generation of Intermediate Parallax-Images for Holographic Sterograms," Proc. SPIE vol. 1914, Practical Holography VII (1993).

Johnson, R. Colin, "Stairway to Reality," OEM Magazine, Sep. 1994.

Fake Space Labs, "Binocular Omni-Orientation Monitor (Boom)".

Popular Science, "Electronic Panning" (Sep. 1992).

Fake Space Labs, "Molly—A Teleoperated Camera Platform.".

Paul Debevec, Rendering Synthetic Objects into Real Scenes: Bridging Traditional and Image-based Graphics with Global Illumination and High Dynamic Range Photograph, University of California at Berkeley, to appear in the SIGGRAPH 98 conference proceedings.

Paul Debevec, Andreas Wenger, Chris Tchou, Andrew Gardner, Jamie Waese, Tim Hawkins, A Lighting Reproduction Approach to Live-Action Compositing, University of Southern California Institute for Creative Technologies, to appear at SIGGgraph 2002, San Antonio, Jul. 21-26, 2002.

* cited by examiner

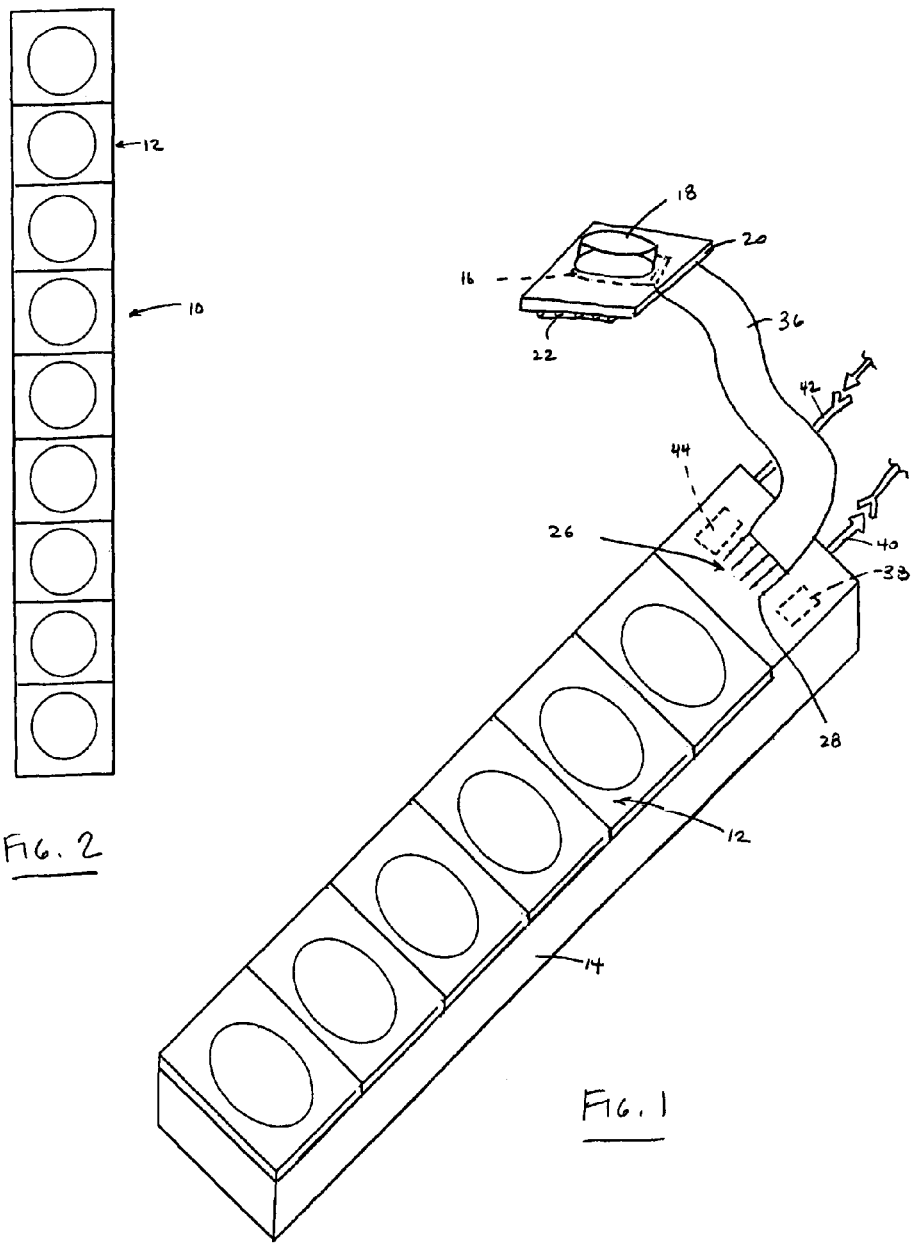

CAMERA ARRANGEMENTS WITH BACK LIGHTING DETECTION AND METHODS OF USING SAME

CROSS-REFERENCE TO RELATED APPLICATIONS

The present application claims benefit of U.S. patent application Ser. No. 10/271,844 filed on Oct. 15, 2002, issued on Jul. 3, 2007 as U.S. Pat. No. 7,239,345, U.S. Provisional Patent Application Ser. No. 60/328,914, filed Oct. 12, 2001, and to U.S. Provisional Patent Application Ser. No. 60/373,433, filed on Apr. 18, 2002, the disclosures of which are incorporated by reference herein.

BACKGROUND OF THE INVENTION

As described in U.S. Pat. Nos. 5,703,961, and 6,327,381, the disclosures of which are hereby incorporated by reference herein, an image of a scene can be captured by cameras at numerous starting viewpoint locations on a viewpoint locus. The image captured at each location contains pixel data. Each item of pixel data represents illumination falling on a particular point within the image. Using the methods disclosed in the aforementioned patents, pixel data from various images can be combined so as to reconstruct a "virtual viewpoint image" representing the image that would have been acquired by a camera at a theoretical or "virtual" viewpoint. For example, the virtual viewpoint may be selected by tracking the movements of a viewer's head or eyes so that the virtual viewpoint and view direction change as the viewer moves. By displaying the virtual viewpoint image to the viewer as the user moves or turns his head, the system provides a close approximation to the view which the user would have if he or she were making the same movements while actually being present within the scene. This effect is commonly referred to as "telepresence."

Where the scene to be displayed is a static scene, the image that provides the original pixel data can be acquired by one camera or a few cameras which move to the various viewpoints in sequence. However, where the scene is a dynamic scene, a camera typically is provided at each starting viewpoint location so that the array of cameras can acquire new sets of images periodically. For example, each camera can acquire a sequence of images much like a conventional sequence of video images. The images taken at a given time by all of the various cameras constitute a single frame of starting image data. The combining operations discussed above are repeated, desirably in real time, to combine pixel data from various images taken within each frame. Such a camera array can generate vast amounts of data.

Aspects of the present invention provide structures for a camera array, which can be used in a system as discussed above, or for other purposes.

Telepresence systems as discussed above do not require the use of modeling techniques commonly used in virtual reality systems. In modeling techniques, the shape and size of a displayed image of a theoretical object are generated based on data defining the size and shape of the object and the position of the object in space relative to the position of the observer. The brightness of the displayed object is computed from object properties such as reflectivity of the theoretical object at various wavelengths in combination with illumination data defining the light which theoretically falls on the object. Such illumination data may include information about the brightness and color of light and may further include information defining the direction of the light. In a typical virtual reality system, the location and properties of light sources are assumed and the illumination data is derived from this information.

In some instances, it is desirable to superimpose a virtual reality display on a telepresence display. For example, in a police training system, a telepresence system may be employed to capture and show a scene in a real building so that a trainee can move through the building in a realistic manner. It may be desirable to superimpose a virtual reality display of a criminal or contraband on the display of the building. In an entertainment system, it may be desirable to display an image of a creature created by virtual reality on a natural scene displayed by a telepresence system.

A problem which can arise in such combined systems is that virtual reality portion of the display may have an unnatural appearance if the assumed illumination used in the virtual reality system differs from the actual illumination on the real scene displayed in the telepresence portion of the display. For example, if a cloud momentarily blocks the sun, the brightness of a displayed natural scene will decrease. If the assumed illumination used in the virtual reality system remains constant, the objects generated by the virtual reality system will appear to grow brighter relative to the remainder of the scene.

This illumination problem also occurs where one real image is to be superimposed over another. For example, a first real scene may be recorded. It may then be desirable to superimpose a second real scene over the first. The second real scene may be an image captured using blue or green screen methods known in the art. In order for the second real scene to look more natural when superimposed over the first real scene, the blue screened image may be illuminated using data collected from the actual scene. The illumination may also be adjusted after the data is collected using computerized modeling techniques known in the art. One such technique is to take the mathematical difference between the illumination of the first real scene and the apparent illumination of the second real scene and apply a corrective illumination. Thus, the brightness of the superimposed image will match that of the remainder of the scene.

A further aspect of the invention provides methods of capturing a scene for telepresence systems and other video systems. In methods according to this aspect of the invention, information about real illumination impinging on the scene is captured substantially simultaneously with the scene. This illumination information may then be used to adjust the apparent illumination of a second image superimposed over the scene.

A further aspect of the invention provides a data storage medium as, for example, a disc, tape or memory, containing stored image data specifying one or more images of a scene and illumination data representing the illumination impinging on the scene at the time the images were captured. A further aspect of the present invention provides an enhanced camera array which can capture information about ambient lighting along with the information constituting one or more images of the scene. A further aspect of the invention provides for processing of the collected data.

SUMMARY OF THE INVENTION

In accordance with the present invention, a camera array may be provided. The array may include a circuit board having front and rear surfaces where the circuit board defines a plurality of camera sights on its front surface. It may also include a control data input connection, a data output connection, and a data bus extending along the circuit board to the camera sights. The array may also include a plurality of camera units. Each camera unit may incorporate an imaging chip defining a plurality of pixels and a connection engaged with one of the sights so that each camera unit is connected to the data bus and one of the camera sights. The array may also include data output circuitry connected between the camera sights and the data output connection for merging pixel data provided by the plurality of cameras into a common data output stream.

The data output circuitry connected between the camera sights and the output connection of the camera array may comprise an image processing chip to provide inline processing of the output data.

The connections of at least some of the camera sights of the camera array may be engaged with at least some of the sights through an umbilical cable such that those cameras may be physically moved with respect to the circuit board.

Some of the cameras of the array may include light tubes connected to the imaging chip such that pixel data may be obtained remote from the imaging chip through the light tube.

Some of the cameras of the array may be physically mounted on the front surface of the board.

A master array comprising a plurality of boards mounted on a frame may also be provided.

The master array may include camera units from each respective board spaced apart in equal distances. Camera units on adjacent boards may also be spaced apart by the same distances.

Each of the common data output streams from the boards of the master array may be combined into a master common data output stream. The master common data output stream may later be parsed to identify each of the common data output streams from each of the boards.

The master array may also be provided with an image processing chip to provide processing of the output data. The chip may be located in the data output circuitry connected between the camera sites and the output connection of each board.

Each of the boards of the master array may further include a data sharing module. The master array may also include a data sharing bus. Each of the data sharing modules may be in communication with the data bus of each board. Each of the data sharing modules may in turn be in communication with each other via the data sharing bus.

The output data from any one board of the master array may be processed by the image processing chip of another board by communicating the output data from the any one board to the another board via the data sharing bus.

The camera array may include a flexible board.

The camera array may also include at least one illumination data capture unit mounted to the board. The illumination data capture units may incorporate a photo sensitive chip connected to the data output circuitry such that the photosensitive chip may provide illumination data impinging on the photo sensitive chip to the data output circuitry.

The camera array may further include at least one illumination data capture unit mounted to the board. The illumination data capture unit may incorporate a camera connected to the data output circuitry such that the camera may provide illumination data impinging on the camera to said data output circuitry.

The common data output data stream of the camera array may be parse to identify each of the data outputs provided by the plurality of camera units in at least one illumination data capture unit.

The common data output stream of the camera array may also be parsed to identify each of the data outputs provided by the plurality of camera units.

A camera array may also be provided wherein the camera array comprises a circuit board having front and rear surfaces. The circuit board may define a plurality of accessory sights on the front surface. It may also include a control data input connection, a data output connection, and a data bus extending along the circuit board to each of the accessory sights. A plurality of camera units where each unit incorporates an imaging chip defining a plurality of pixels may also be provided. The cameras may also include a connection engaged with one of the accessory sights so that each camera unit is connected to one of the accessory sights. The camera array may also include a plurality of sensors where each sensor is engaged with one of the accessory sights. The array may also include data output circuitry connected between the accessory sights and the data output connection for merging data provided by the plurality of cameras and the plurality of sensors into a common data output stream.

The present invention also includes methods of recording a scene. One such method includes repeatedly capturing pixel data constituting one or more images of the scene. It also includes repeatedly capturing illumination data representing illumination impinging on the scene substantially simultaneously with the repeated capture of pixel data.

The present invention also includes methods of providing an image to be displayed. One such method comprises providing captured scene data representing one or more images of a real scene and providing illumination data representing real illumination impinging on the real scene. It may also include providing a virtual reality image of a theoretical object by modeling the theoretical object using the illumination data to define illumination impinging on the theoretical objects. It may also include providing a combined image including elements of the real scene based on the captured scene data and including the virtual reality image.

Real illumination impinging on the scene may change over time. The step of providing illumination data may also include providing successive sets of illumination data representing changes in illumination with time. The step of providing a virtual reality image may also include providing successive virtual reality images based on the successive sets of illumination data.

Another method of providing an image to be displayed may include providing first captured scene data representing one or more images of a first real scene and providing illumination data representing real illumination impinging on the first real scene. It may also include providing second captured scene data representing one or more images of a second real scene distinct from said first real scene. It may also include providing a combined image including elements of the first real scene based on said captured first real scene data and including the second captured data scene illuminated in accordance with the illumination data representing real illumination impinging on the first real scene.

The real illumination impinging on the first scene may change with time. The step of providing illumination data may include providing successive sets of illumination data representing changes in illumination with time. The step of providing second captured scene data may include providing successive second captured scene data images based on the successive sets of illumination data.

BRIEF DESCRIPTION OF THE DRAWINGS

FIG. 1 depicts a prospective view of a camera array in accordance with the first embodiment of the present invention;

FIG. 2 depicts a frontal plan view of the camera array of FIG. 1;

DETAILED DESCRIPTION

Figure 3:
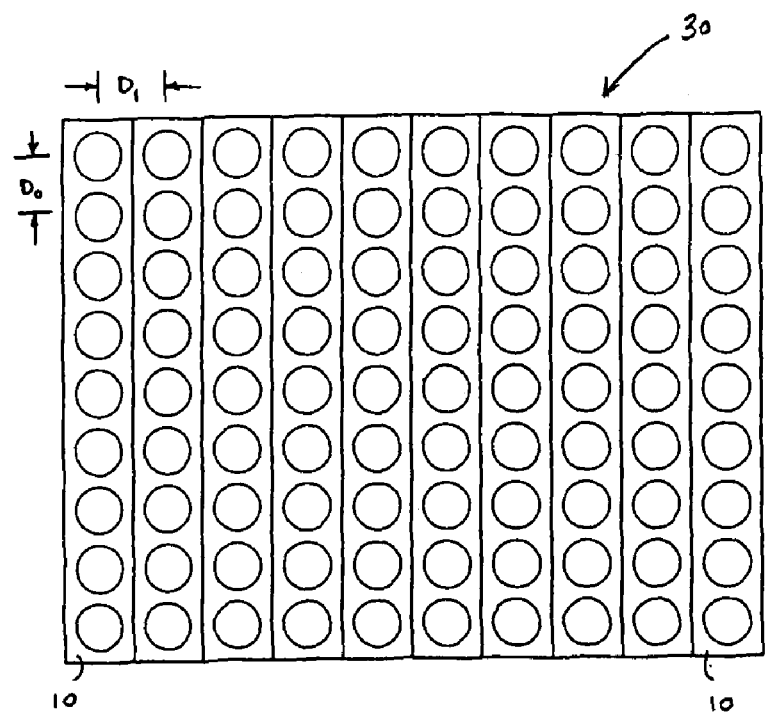
FIG. 3 depicts a frontal plan view of a larger array of cameras in accordance with the second embodiment of the present invention.

In describing the embodiments illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

The overall physical and mechanical structure of a camera array in accordance with one aspect of the invention is depicted schematically in FIGS. 1-3. As seen in FIG. 1, the basic camera array 10 may include several camera units 12 and an array board 14. Typically, the camera units 12 will be tiled such that there are no gaps between them. Each camera unit 12 desirably includes a solid state imaging chip 16 such as a CMOS imaging chip, a CCD imaging chip or other form of semiconductor imaging device. The preferred characteristics for the imaging chip are set forth in table format hereinafter. Chips having greater or lesser capabilities than those set forth in the camera specification summary table may be employed. For example, higher resolution imaging chips, such as those used to capture high definition television (HDTV) images may be used. The imaging chip desirably is arranged to provide color image data, typically with separate data elements representing illumination falling on different pixels.

Each imaging unit 12 preferably also includes a focusing lens 18. Each imaging unit desirably also includes a unit housing 20. The imaging chip may be mounted on or in the housing and the lens 18 also may be mounted to the housing so that the lens is aligned with the imaging chip. Each imaging unit includes an electrical connector or mounting 22 as, for example, a multi-pin plug, pin grid array or the like arranged to convey data from the imaging chip and to convey power and commands to the imaging chip. Each camera unit may further include ancillary devices such as signal amplifiers, signal compression chips and the like mounted in or on the unit housing 20 and electrically connected between the imaging chip 16 and connector 22.

The array board 14 has numerous mating connection sites 26, each adapted to receive the connector of one camera unit. The sites are electrically connected to conductors 28 on or in the array board schematically indicated in FIG. 1. The features at each mounting site 26 are arranged to connect the elements of one connector 22 to the appropriate conductors 28 and also are arranged to physically hold the housing 20 of each unit in place relative to the array board 14. As shown in FIGS. 1-3, the array board is arranged to hold the various camera units in an ordered array, i.e., so that the imaging axes of the various units 12 are arranged in an ordered pattern as, for example, in a single row.

Figure 4:
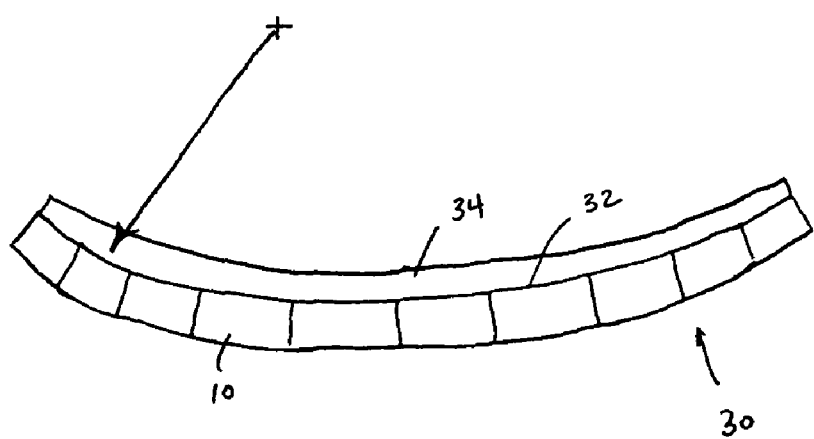
FIG. 4 depicts a top plan view of a camera array in accordance with the third embodiment of the present invention.

The array boards are arranged so that they can be "tiled" together to form a larger array 30 (FIGS. 3 and 4). Typically, in the larger array, the distances $D_1$ between camera units on adjacent arrays 10 are equal to the distances $D_0$ between camera units within the same array 10. However, in some circumstances such as when objects in the scene are varying distances from the array 30, it may be advantageous to overload the density of a particular area of the array.

The larger array 30 may be substantially planar or else may be formed on a curved surface as, for example, on a generally cylindrical surface 32 defined by a frame supporting the array boards of the individual arrays 10. This provides a generally cylindrical viewpoint locus. To accommodate other shapes for the locus, the array boards 14 may be flexible. For example, the array boards may be formed from flexible but substantially inextensible circuit panel materials. Also, each camera unit 20 may be physically detachable from the array board 14. An umbilical cable such as a multi-conductor ribbon cable 36 may be provided for electrically connecting the connector 22 of a camera unit to a site 26 on the array board. The housings of the camera units thus can be mounted on a frame (not shown) defining a viewpoint locus of essentially any shape as, for example, on a spherical frame.

Figure 6:
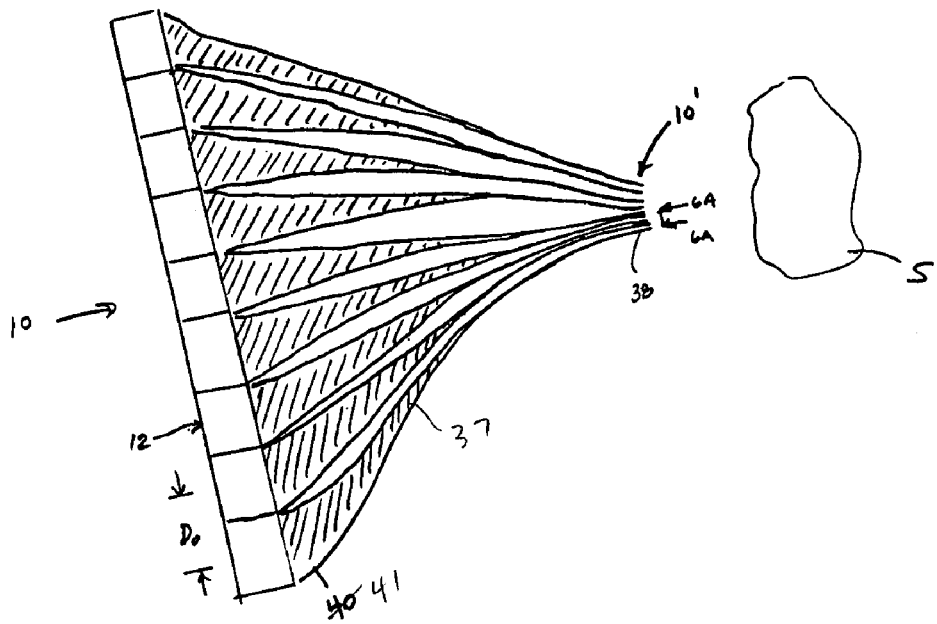
FIG. 6 depicts a top plan view of a camera array in accordance with the fifth embodiment of the present invention.

Light tubes or fiber optics 37 may be used to reduce the scale of the array 10 or large array 30 as shown in FIG. 6. This technique is beneficial for certain close-up scenes, such as surgical procedures. The light tubes 37 utilized for this purpose may be those commonly available. Such light tubes 37 are typically fiber optic cables made of individual glass fibers drawn, assembled, and fused into high resolution, vacuum tight, solid fiber arrays. Preferably, the light tubes will be constructed from ordered arrays, so that the scene may be transmitted through the light tubes without being distorted.

Figure 6A:
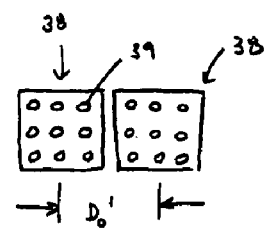

As best seen in FIG. 6a, the tip end 38 of each light tube or fiber optic array 37 remote from the camera array has individual fibers 39 at specific spacing within the tube. The opposite end, or root end, 40 has individual fibers spaced at larger distances. For example, at the root end 40, the array may cover the full array of pixels in the sensing chip in the camera associated with that light tube. Accordingly, the tip ends 38 of the light tubes can be placed at spacings $D_0'$ smaller than the spacings $D_0$ between the imaging units 12. The imaging units will deliver the same set of images which would be delivered by theoretical imaging units dispersed at spacings $D_0'$ of the tip ends.

The light tube 37 may attach to the imaging unit 12 at its proximal end and to focusing lens (not shown) at its distal end. In order to facilitate connection with the focusing lens, the light tube 37 typically must be partially hollowed at its distal end where the focusing lens may be secured with index matching epoxy or other similar means.

It is also possible to utilize umbilical cables 36 in conjunction with light tubes 37. For example, the imaging units 12 may be extended out along umbilical cables as shown in FIG. 1. Light tubes 37 may then be attached to the imaging unit such that the lenses 18 may be located away from the imaging units. It will be appreciated that the techniques of using umbilical cables 36 and/or light tubes 37 expand the arenas in which the camera arrays 30 may be utilized by significantly reducing the physical limitations of placing such an array.

The camera array 10 may also include signal processing capabilities. A single signal processing chip (not shown) may be included downstream of each imaging unit 12 prior to connection to the data bus. In this case, each imaging unit 12 will have its own processing chip. Alternatively, one processing chip may be provided for the entire array board 14. If so provided, the processing chip (not shown) will typically be provided along the data bus prior to the output connector 40. The signal processing chips are capable of processing the signal from the imaging units. For example, such processing may include data compression.

Where multiple camera arrays 10 are provided, such as shown in FIG. 3, each camera array 10 may further include a data sharing module (not shown). Each of the data sharing modules will be in communication with the data bus of the respective array board 10. Each of the data sharing modules may, in turn, be in communication with each other via a data sharing bus. Data may be output through the data sharing bus from any one array board 10 to another array board. Any data shared from one array board 10 may be processed by the image processing chip of another array board.

The basic camera array 10 may also include a microphone (not shown) to sample an audio channel. Preferably, two such microphones will be provided per array 10 or large array 30 so that stereo audio data may be sampled. Where such microphones are included, they will typically utilize the data connection of one of the imaging units 12 of the array 10, 30.

The data output from each of the various camera's conductors 28 is forwarded along through a data bus (not shown). Each array 10 desirably includes circuitry 38 on the array board for combining data acquired by the various cameras into a common output data stream. In its simplest form, such circuitry may include one or more high speed multiplexers. The output circuitry also may be arranged to compress data from the individual camera units, or the combined data stream or streams so as to reduce the required bandwidth in the larger system. The output data combining circuit 38 is connected to an output connector 40 for conveying the common output data stream to the larger system. Each array desirably also includes one or more connections 42 for receiving command and control signals from the larger system and also includes internal command and control circuitry 44 connected to the various sites 26 and hence connected to the various camera units.

The camera units desirably are controllable to acquire less than a full complement of pixel data and to acquire an image of low resolution or a partial image. The internal control circuitry 44 and the external control connection 42 also may be arranged to provide a common synchronization signal such as a genlock signal to the individual camera units so as to operate all of the camera units in synchronism with one another or at predetermined times within a common timing scheme. For example, during each frame all of the cameras may capture their images simultaneously or at equal intervals in a sequence coordinated with the spatial position or view direction of each camera unit within the individual array 10. Similarly, the various camera units constituting the larger array 30 may be synchronized or may be arranged to capture images at various times in a predetermined progression.

Although the imaging units 12 have been previously described as having a single camera, it is possible that multiple cameras be utilized per unit, or single cameras be utilized for multiple units. For example, in a typical array of ten imaging units 12, five HDTV cameras with two outputs each may be utilized. Alternatively, multiple VGA cameras may be used per imaging unit 12.

The input and output connections 40 and 42 to the array 10 may be fiberoptic connections rather than electrical connections. Likewise, the conductors 28 of the array panel and the ribbon cable 36 may be partially or entirely replaced by fiber optic signal paths. In this case, connectors 22 and the mating elements of each site may be replaced by appropriate optical connectors.

The common output stream passing out through the upward data connector 40 desirably includes the information needed to form a data file according to the following table:

Overview

This table describes the file format for the data captured by the camera arrays. The data captured may include both images and sampled sound. The requirements for the format are reviewed, then a format meeting these requirements is described.

This format is intended to be the "raw" format used to store captured data in real time.

Each file will typically contain the output from one physical output (e.g., fiber channel or other connector) from a camera array. The format is not intended to support direct, synchronized playback of the contents. The files in this format will be processed and possibly combined before playback or other processing occurs.

Requirements

A. Output from One or More Cameras and/or Microphones. A single file will contain data from one or more cameras and/or microphones. It must be possible to associate data in the file with the source of the sampled data.

B. Synchronization. It must be possible to determine the original order of the frames captured from a single camera or sound sampled from a particular microphone. It must also be possible to determine the correct temporal order for images and sound samples captured from different cameras and microphones. This should be supported both for images and samples stored in the same file and those stored in separate files (to allow capture of more simultaneous' data than can be sent across a single connection).

C. Frame Suppression and Partial Frames. Frames may be suppressed by the array. This may include partial or full suppression. Frames may be suppressed based on the amount of motion detected in the scene; if it falls below some threshold, some or all of the data may be suppressed. If only some of the data is suppressed, the file must include the information required to determine what portion of the image was captured.

D. Support For Programmable Sequences. Cameras may be programmed to capture images at different rates and starting/ending times, and the file format must support storage of these sequences.

E. Sequential Output. The format must allow data to be written sequentially as it becomes available and must not rely on being able to seek to a particular location in the file before writing. This requirement is imposed both to maximize throughput and to support storage devices that only allow sequential writes.

File Format

The file will start with a file header containing global information about all the data stored in the file, followed by one or more data blocks. Each data block will consist of a block header followed by the block data.

All data blocks will begin with a block size field that contains the number of bytes in the entire block (including the header and the associated data). The next field in all blocks indicates the block type. Two types of blocks are currently defined; one is used for captured images, the other for sampled sound. By requiring all blocks to begin with these common fields, applications can easily skip over blocks containing data they are not interested in or do not know how to interpret.

The remainder of the block header (following the size and type fields) will vary depending on the block type. The header formats for the two currently supported types are described later in this section.

Data will be captured in sessions. A session represents the complete capture activity. For example, a session could consist of capturing data from 100 cameras and 10 microphones for 30 seconds. In most cases, a file as defined in this document will only contain a portion of the session's data. A file can only contain data from a single session.

A. File Header. This section defines the fields in the file header. Each file starts with a file header.
  (i) Session Identifier. This is a unique identifier for the session associated with the data contained in the file. It is likely that the software that controls the camera array (i.e., external software that sends commands to the array) will assign the session ID. Multiple array boards (or network connectors within one array board) may capture data for a single session, and the session identifier will be used to determine which files are parts of the same session.
  (ii) Array Identifier. Contains an identifier that uniquely identifies the camera array that captured the data contained in the file.
  (iii) Number Of Cameras. Contains the total number of cameras that may contribute data to this file. This may be higher, but not lower, than the actual number of cameras contributing data.
  (iv) Number Of Microphones. Contains the total number of microphones that may contribute data to this file. This may be higher, but not lower, than the actual number of microphones contributing data.
  (v) Maximum Image Width. Contains the maximum width of the captured images stored in the file. Note that storage of partial images is supported, so this can be used to indicate the full width of captured frames. It's also possible that cameras may capture at different resolutions, and in that case this value represents the maximum width captured by any camera.
  (vi) Maximum Image Height. Contains the maximum width of the captured images stored in the file. Note that storage of partial images is supported, so this can be used to indicate the full width of captured frames. It's also possible that cameras may capture at different resolutions, and in that case this value represents the maximum width captured by any camera.
  (vii) Maximum Frame Rate. Contains the maximum number of frames per second being captured by any camera contributing data to the file.

B. Image Block Header. This header will appear at the beginning of each image data block, and will be followed immediately by the block of pixel data it describes.
  (i) Block Size. Contains the size, in bytes, of the entire data block (the block header and the associated data that follows it). This implies that block size can be determined before the data is sent from the array to storage. Either the array must be able to buffer a full block, or it must be possible to determine the block size from the format (not usually possible for compressed formats).
  (ii) Block Type. Contains a predefined value indicating this is an image block header.
  (iii) Camera Identifier. Contains a unique (across arrays) identifier for the camera that captured the image data stored in this block. This identifier is used to match the camera to calibration data.
  (iv) Frame Timestamp. This is a timestamp from a high-resolution timer (approximately 90 KHz). It must be the same for all frames taken at the same time across multiple cameras and arrays.
  (v) Window Of Captured Pixels. The header will contain the width, height, x offset and y offset of the image data stored in this block. This supports partial frame capture/suppression.
  (vi) Bits Per Pixel. Contains the number of bits representing each pixel.
  (vii) Pixel Format. Contains an identifier indicating the format of the pixel data (e.g., 10 bit Bayer encoded, 24 bit RGB). This identifier should also indicate if any padding is used between pixels or at the end of each row of pixels.
  (viii) Compression Method. Contains an identifier indicating which compression method, if any, was used to compress the image data.

C. Audio Block Header. This header will appear at the beginning of each data block, and will be followed immediately by the block of audio data it describes.
  (i) Block Size. Contains the size, in bytes, of the entire data block (the block header and the associated data that follows it). This implies that block size can be determined before the data is sent from the array to storage. Either the array must be able to buffer a full block, or it must be possible to determine the block size from the format (not usually possible for compressed formats).
  (ii) Block Type. Contains a value indicating this is an audio block header.
  (iii) Microphone Identifier. Contains a unique (across arrays) identifier for the microphone that captured the audio sample stored in this block.
  (iv) Frame Timestamp. This is a timestamp from a high-resolution timer (approximately 90 KHz). It must be the same for all frames taken at the same time across multiple cameras and arrays.
  (v) Sample Size. Contains the number of bits representing each sample.
  (vi) Sample Format. Contains an identifier indicating the format of the audio data (e.g., 16 bit stereo). This identifier should also indicate if any padding is used between samples.
  (vii) Compression Method. Contains an identifier indicating which compression method, if any, was used to compress the sample data.

Figure 5:
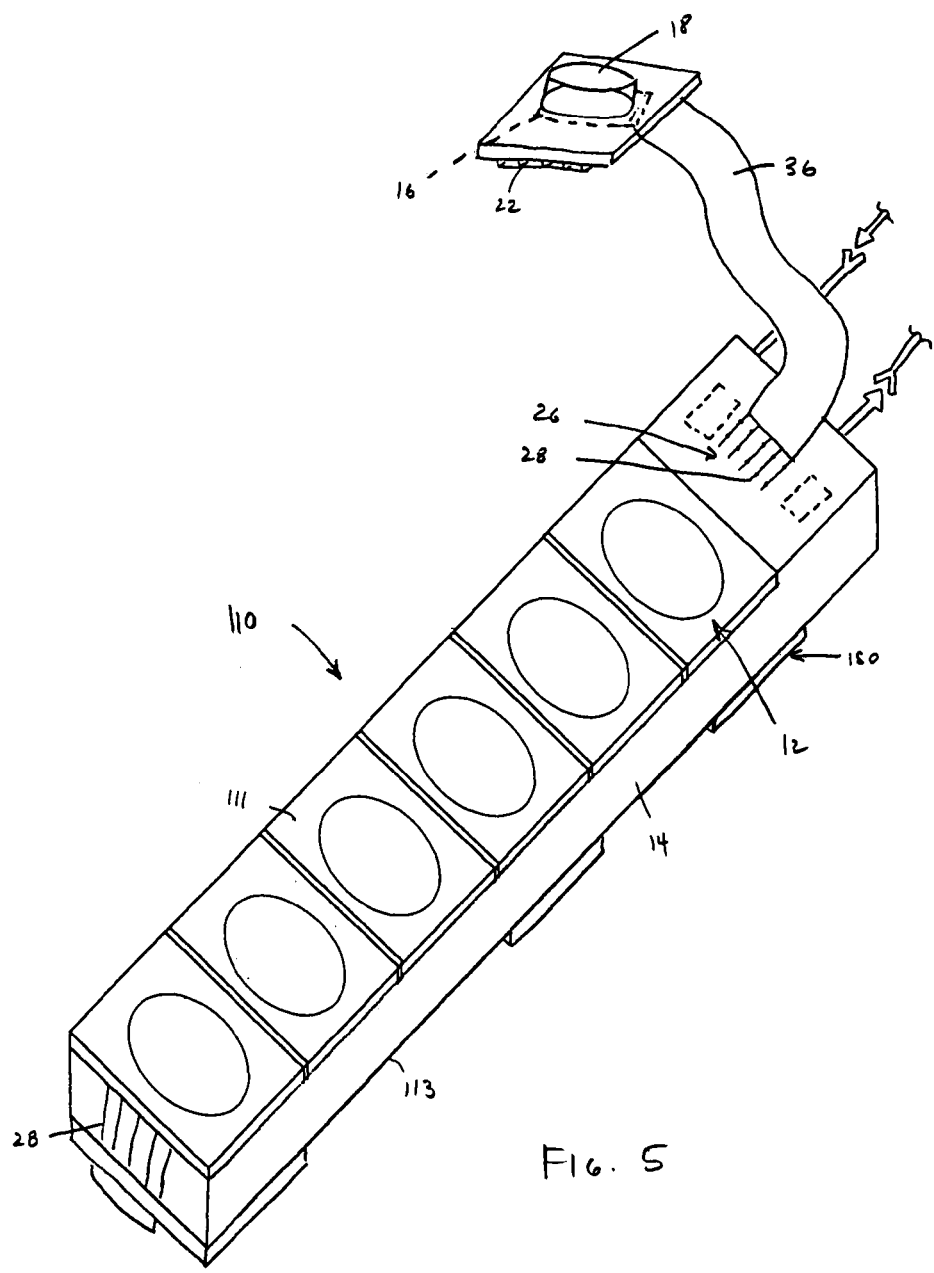
FIG. 5 depicts a perspective view of a camera array in accordance with the fourth embodiment of the present invention.

FIG. 5 depicts camera array 110 according to a further aspect of the invention including camera units 12 and an array board 14 similar to the corresponding elements discussed above with reference to FIG. 1. As discussed above, each camera unit includes a focusing lens 18, an imaging chip 16 and a connector 22 for connecting the imaging chip to the connection sites 26 of the board 14 and also connecting the imaging chips to the connectors 28 on the board. In the array 110 of FIG. 5, the camera units 12 are physically positioned on a front surface 111 of the board or can be moved away from the board and connected through umbilical cables 36 as discussed above. The camera units 12 may also connect to a light tube 37, as previously discussed. The conductors 28 on the board preferably extend around or through the board onto the rear surface 113 of the board, opposite to front surface 111.

Figure 7:
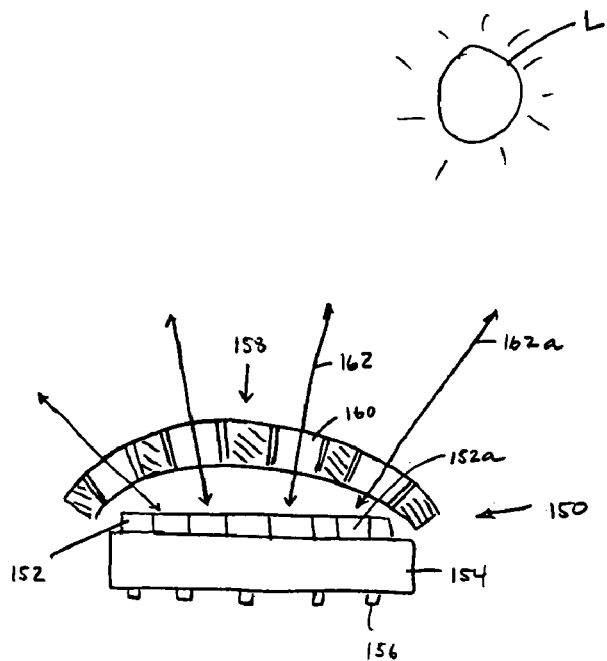
FIG. 7 depicts a side plan view of an illumination data capture unit in accordance with the present invention.

The camera array further includes one or more illumination data capture units 150. Each illumination data capture unit 150 includes a photosensitive chip such as a CMOS or CCD array 152 (FIG. 7). These arrays may be similar to those employed in the imaging chips 16. Depending upon the application, the photosensitive chips 152, however, may have lower numbers of individually operable elements or "pixels" than the imaging chips.

Each illumination data capture unit 150 also includes a body 154 and a connector 156 for connecting the photosensitive chip 152 to the conductors 28 of the board. The illumination data capture unit 150 also may include ancillary devices such as amplifiers, data compression units and the like which cooperate with the photosensitive chip.

Each illumination data capture unit 150 may further include a collimating unit 158 incorporating a large array of collimating openings 160. Each such opening may be aligned with one individual element or pixel of chip 152. As best seen in FIG. 7, each element of chip 152 "sees" light along a particular axis 162. For example, element 152a is exposed to light directed along axis 162a. Preferably, the axes 162 of the various collimating elements are disposed at different orientations relative to the plane of chip 152. For example, the axes 162 may be disposed on radii of a spherical sector so that the axes slope away from one another in two dimensions. Thus, the signal generated by each element of each chip 152 will represent light impinging on the unit 150 from a different direction.

Each camera array 110 may include several illumination data capture units 150 arranged at various locations on the rear surface 113 of board 14. The photosensitive chip 152 within each unit 150 is linked to the conductors 28 on board 14 by the connector 156 of such unit. Each chip 152, and hence each unit 150, provides a set of signals indicating illumination impinging on the rear surface of the board along a set of axes 162. Preferably, each element in each chip provides information about the illumination intensity at a plurality of wavelengths, i.e., a signal indicating both the intensity and color of the light impinging along the associated axis 162. The output data combining circuit 38 of the board is arranged to take the signals from ambient light detection units 150 and combine them with the signals from camera units 12 in a predetermined format so that the data representing illumination (from units 150) can be identified and so that the signals representing light falling on the various elements of each chip 152 can be identified. Thus, the output stream passing out of the board through the output data connector 40 includes both data derived from the pixel data acquired by the various cameras 12 and data representing illumination, presented in a predetermined format so that each data element can be properly identified.

Figure 8:
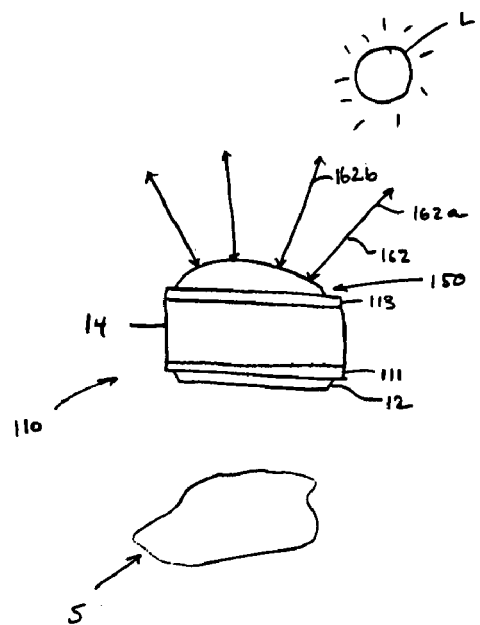
FIG. 8 depicts a side plan view of the illumination data capture unit of FIG. 7 mounted to a camera array board.

In use, the camera array 110 is positioned so that the front face 111 of the board faces toward a scene S to be acquired whereas the rear face 113 faces away from the scene. Camera units 12 capture pictures of the scene in the manner discussed above. Light impinging upon the scene S, at least from distant light sources L, will also impinge on illumination data capture units 150. Provided that light sources L are at a substantial distance from scene S and from the camera array 110, the light from any given light source L will impinge on the rear surface of the board and, hence, on detection units 150 at substantially the same angle as the light from the same source impinges on scene S. Accordingly, the signal from an array element representing light impinging along a particular axis 162 represents the light impinging on scene S in the same direction. The data stream at output connector 40 provides a combined record including both the pixel data from camera units 12 and the illumination data from illumination data capture units 150 defining the illumination impinging upon the scenes when the scene was captured. FIG. 8 depicts a side plan view of a typical camera array 110 in use.

This combined record can be stored in any data storage medium. The pixel data can be used to reconstruct images of the scene in a telepresence system. The illumination data can be used as is or can be further processed to derive a geometrical representation of a set of theoretical light sources representing the light sources present when the scene was captured. This information can be used in a virtual reality system to define light sources illuminating virtual reality objects to be superimposed on the image of the scene created by the telepresence system. The illumination data will change with time, as the illumination impinging on the scene changes. Thus, the illumination data included in the output data stream and incorporated in a stored record should include successive sets of illumination data captured at various times. The illumination data can be included in the combined record in any convenient format. For example, illumination data can be stored in the same file as pixel data, with a block of illumination data provided before each block or frame of pixel data. Alternatively, the illumination data can be recorded in a separate file with time-stamped data defining the time of capture of each block of illumination data. The file containing the pixel data can contain similar time stamps. In one arrangement, new illumination data is captured as often as the pixel data, i.e., one set of illumination data is captured with every set of frames of pixel data. Where the illumination sources change slowly, as, for example, in capture of a typical outdoor scene, the illumination data may be captured less often so that one set of illumination data is associated with a set of several frames of pixel data.

Camera arrays 110 with illumination detection units 150 can be combined with one another to form larger arrays as discussed above with reference to FIGS. 3 and 4.

The illumination detection units 150 can be varied considerably. For example, the illumination detection units 150 themselves may include cameras with lenses similar to the camera units 12, so that the output from each illumination detection unit is a picture of the light sources including pixel data representing pictures of the light sources illuminating the scene. The pixel data in such pictures represents the ambient illumination. Also, any number of illumination detection units can be provided in each camera array.

In a method of reconstruction and superimposition according to a further aspect of the invention, the pixel data defining the scene from the various cameras is processed to provide a series of telepresence images. The illumination data provided by the illumination data units is processed to provide a series of mathematical representations of the light sources illuminating the scene. The mathematical representation will change with time, depending upon changes in the captured illumination data. This series of representations is combined with geometric and reflectivity data of a theoretical object or objects to be superimposed on the image so as to provide virtual reality objects which, when displayed, will vary in brightness in the same manner as the real objects in the scene.

It will be appreciated that the term "camera" as used herein is intended to include any sensor device capable of sensing waves of energy varying in wavelength. For example, cameras may detect images in the visible light spectrum, or they may detect infrared or ultraviolet energy. Additional sensors such as seismic, acoustic, nuclear, global positioning (GPS), accelerometers, and multiple degree of freedom devices may also be utilized. In the case of such sensors, command and control signals may be adapted to mock those of typical camera linking software. In the case of the typical video camera array, any one of these additional sensors may be added as one channel of the array such that the information they provide may be channeled contemporaneously with the video signal, for later identification and processing.

Although the term camera is not to be construed as being limited to cameras capable of viewing the visible spectrum, specifications for a typical camera are included in the following table:

General

CMOS, single chip
Bayer encoded
Addressable 1K×1K resolution with ability to utilize 1280×1024
  up to +30% and −5% resolution variation acceptable (~1300×~950)
Nominal 12-bit ADC
Unique ID per camera for calibration
  identifiable according to which data entry port the camera is plugged in to
  not tied into the physical location of the camera within the array Physical Typically 2" square packaging for use in a 20"×2" array board
  pins in back of packaging enabling easy plug-in and removal
  PGA mount
  8 MB per camera memory inside packaging
C-mount lens adapter
POSS ¼ hole at corners to accommodate lamps
Hot swap Shutter/Exposure Control Genlock capability across cameras within array and also across multiple array cards
Individual programmable trigger capability
  programmable for special effects sequenced shots
  1 msec minimum interval between adjacent camera shots
  ability to sequence from one array to the next
  ability to synchronize multiple arrays (e.g., camera 1 on n arrays, then camera 2, etc.)
Automatic and programmable exposure times
  1/1000 sec and up Output Digital Video out (without color processing)
  any format is acceptable
Minimum 30 frames per second
  30 fps to parallel output from array boards
  single shot mode output capability to Flashcard or digital output
No output per camera if no change in data
  threshold capability to determine change
  possible partial frame output to limit bandwidth, e.g., left side, right side, top, or bottom thereby cutting frame size at least in half
Capable of being attached via an umbilical extension cable approximate length 5 feet
  implies use of internal amplifier in camera Array Plug-in Board (to Hold the Cameras)

Initial design for 10×1 array of cameras (20"×2" board)
Array board to be designed so arrays can be tiled with no gaps between cameras
Parallel data video output(s)
  modular design with or without output section
  flexible design (i.e., TMS custom or FC2)
Flashcard option for single/few shot operation
  ability to download data from flash card over digital interface if desired
Standard photographic external flash output
Connectors or jumpers for genlock, power, communications (programming), external shutter, etc.
  ability to operate from battery or AC
Heavy-duty (thick) board substrate capable of being mounted rigidly on custom frame
  screw mount points for attachment to frame
PGA sockets (or similar) preferably designed with future high-resolution cameras in mind
Ability to have a series of various exposure shots taken to capture wide dynamic range of a scene
  ability to do this in the midst of a frame rate capture (take hit for n frames then continue)
If FC interfaces, must be able to handle partially loaded array boards across various fibers.

Optional

In line compression
  a 256 PE array clocking at 400 MHz losslessly compressing a 1K×1K image in less than 1/30th of a sec with 8 MB of RAM on the chip
  may include massively paralleled processing chip to provide in-line processing of 1280×1024 image prior to outputting signal from the board Battery Modes still shots only with no power to unused chips [output section, SIMD chips, on-board memory, just to flash card]
full functionality running off car battery Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A master camera array comprising:
  a circuit board having front and rear surfaces, the circuit board defining a plurality of camera sites on said front surface, a control data input connection, a data output connection and a data bus extending along the circuit board to said camera sites;
  a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of camera units into a common data output stream; and at least one illumination data capture unit mounted to said circuit board, said at least one illumination data capture unit incorporating a photosensitive chip such that said photosensitive chip may provide illumination data impinging on said photosensitive chip to said circuit board.

2. The master camera array as claimed in claim 1 wherein said data output circuitry connected between said camera sites and said data output connection comprises an image processing chip to provide processing of said output data.

3. The master camera array as claimed in claim 1 wherein the connections of at least some of said camera units are engaged with at least some of said camera sites through an umbilical cable so that such camera units can be physically moved with respect to the circuit board.

4. The master camera array as claimed in claim 1 wherein some of said camera units include light tubes connected to the imaging chip such that said pixel data may be obtained remote from said imaging chip through said light tubes.

5. The master camera array as claimed in claim 1 wherein said camera units are physically mounted on the front surface of said circuit board.

6. The master camera as claimed in claim 5, further comprising a frame and a plurality of circuit boards mounted to said frame.

7. The master camera array as claimed in claim 6 wherein the camera units mounted on each of said circuit boards are spaced apart from one another by a uniform distance, and wherein camera units on adjacent boards are spaced apart from one another by the same distance.

8. The master camera array as claimed in claim 6, wherein said common data output stream from each circuit board may be combined into a master common data output stream, said master common data output stream capable of being parsed to identify each of said common data output streams from each of said circuit boards.

9. The master camera array as claimed in claim 6 wherein said data output circuitry connected between said camera sites and said output connection of each circuit board comprises an image processing chip to provide processing of said output data.

10. The master camera array as claimed in claim 9 wherein each of said circuit boards further includes a data sharing module and wherein said master camera array further includes a data sharing bus, each of said data sharing modules being in communication with said data sharing bus of each respective circuit board and said data sharing modules being in communication with each other via said data sharing bus.

11. The master camera array as claimed in claim 10 wherein said output data from any one circuit board of the master camera array may be processed by said image processing chip of another circuit board by communicating said output data of said any one circuit board to said another circuit board via said data sharing bus.

12. The master camera array as claimed in claim 1 wherein said circuit board is flexible.

13. The master camera array as claimed in claim 1 further comprising at least one illumination data capture unit mounted to said circuit board, said illumination data capture units incorporating a camera connected to said data output circuitry such that said camera may provide illumination data impinging on said camera to said data output circuitry.

14. The master camera array as claimed in claim 13, wherein said common data output stream may be parsed to identify each of said data outputs provided by said plurality of camera units.

15. The master camera array as claimed in claim 1, wherein said common data output stream may be parsed to identify each of said data outputs provided by said plurality of camera units and at least one illumination data capture unit.

16. A camera array comprising:

a circuit board having front and rear surfaces, the circuit board defining a plurality of accessory sites on said front surface, a control data input connection, a data output connection and a data bus extending along the circuit board to said accessory sites;

a plurality of camera units, each such camera unit incorporating an imaging chip defining a plurality of pixels and a connection engaged with one of said accessory sites so that each camera unit is connected at one of said accessory sites;

a plurality of sensors, each such sensor engaged with one of said accessory sites;

data output circuitry connected between said accessory sites and said data output connection for merging data provided by said plurality of camera units and said plurality of sensors into a common data output stream; and at least one illumination data capture unit engaged with one of said accessory sites, said at least one illumination data capture unit incorporating a photosensitive chip such that said photosensitive chip may provide illumination data impinging on said photosensitive chip.

17. A camera array comprising:

a circuit board having front and rear surfaces, the circuit board defining a plurality of camera sites on said front surface, a control data input connection, a data output connection and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of cameras into a common data output stream;

wherein some of said cameras include light tubes having tip ends and root ends, the root ends connected to the imaging chip such that said pixel data may be obtained remote from said imaging chip through said light tube, said tip ends of said light tubes being spaced closer together than said root ends.

18. A camera array as claimed in claim 1, wherein said illumination capture unit is mounted to the rear of said board.

19. A camera array comprising:

a circuit board, the circuit board defining a plurality of camera sites, a control data input connection, a data output connection and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of cameras into a common data output stream;

at least one illumination data capture unit mounted to said circuit board, said at least one illumination data capture unit incorporating a photosensitive chip such that said photosensitive chip may provide illumination data impinging on said photosensitive chip.

20. The camera array of claim 19, wherein said common data output stream may be parsed to identify each of said data outputs provided by said plurality of camera units and at least one illumination data capture unit.

21. A camera array comprising:

a circuit board having front and rear surfaces, the circuit board defining a plurality of camera sites on said front surface, a control data input connection, a data output connection and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of cameras into a common data output stream;

at least one illumination data capture unit mounted to said board, said at least one illumination data capture unit incorporating a camera such that said camera may provide illumination data impinging on said camera to said circuit board.

22. The camera array of claim 20, wherein said common data output stream may be parsed to identify each of said data outputs provided by said plurality of camera units.

23. A master camera array comprising:

a frame and a plurality of circuit boards mounted to said frame, each circuit board having front and rear surfaces, said circuit boards defining a plurality of camera sites on said front surfaces, a control data input connection, a data output connection and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of cameras into a common data output stream;

wherein said common data output stream from each circuit board may be combined into a master common data output stream, said master common data output stream capable of being parsed to identify each of said common data output streams from each of said circuit boards.

24. A master camera array comprising:

a frame and a plurality of circuit boards mounted to said frame, each circuit board comprising:

a front surface defining a plurality of camera sites, a control data input connection, a data output connection, and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of cameras into a common data output stream, said data output circuitry comprising an image processing chip to provide processing of said output data; and a data sharing module;

wherein said master camera array further comprises a data sharing bus, each of said data sharing modules being in communication with said data sharing bus of each respective circuit board and said data sharing modules being in communication with each other via said data sharing bus.

25. The master camera array as claimed in claim 24 wherein said output data from any one circuit board of the master array may be processed by said image processing chip of another circuit board by communicating said output data of said any one circuit board to said another circuit board via said data sharing bus.

26. A camera array comprising:

a circuit board, the circuit board defining a plurality of camera sites, a control data input connection, a data output connection and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of camera units into a common data output stream;

at least one illumination data capture unit mounted to said circuit board, said at least one illumination data capture unit incorporating a photosensitive chip such that said photosensitive chip may provide illumination data impinging on said photosensitive chip to said circuit board;

wherein said common data output stream may be parsed to identify each of said data outputs provided by said plurality of camera units and at least one illumination data capture unit.

27. A camera array comprising:

a circuit board, the circuit board defining a plurality of camera sites, a control data input connection, a data output connection and a data bus extending along the circuit board to said camera sites;

a plurality of camera units, each such camera unit incorporating an imaging chip defining a plurality of pixels and a connection engaged with one of said camera sites so that each camera unit is connected to said data bus at one of said camera sites;

data output circuitry connected between said camera sites and said data output connection for merging pixel data provided by said plurality of camera units into a common data output stream;

at least one illumination data capture unit mounted to said board, said at least one illumination data capture unit incorporating a camera connected to said data output circuitry such that said camera may provide illumination data impinging on said camera to said data output circuitry;

wherein said common data output stream may be parsed to identify each of said data outputs provided by said plurality of camera units.

* * * * *